US011088915B1

(12) United States Patent
Malhotra et al.

(10) Patent No.: US 11,088,915 B1
(45) Date of Patent: Aug. 10, 2021

(54) LIVE NETWORK SANDBOXING ON A CENTRALIZED MANAGEMENT SYSTEM

(71) Applicant: Cisco Technology, Inc., San Jose, CA (US)

(72) Inventors: Neha Malhotra, Fremont, CA (US); Vandhana Somaskanthan, Milpitas, CA (US); Renuka Mohan Channapatna, Milpitas, CA (US); Vinay Prabhu, Milpitas, CA (US); Jigar Dinesh Parekh, Fremont, CA (US); Huayu Fu, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/745,897

(22) Filed: Jan. 17, 2020

(51) Int. Cl.
*H04L 12/24* (2006.01)
*G06F 16/22* (2019.01)

(52) U.S. Cl.
CPC ...... *H04L 41/0893* (2013.01); *G06F 16/2246* (2019.01); *H04L 41/085* (2013.01); *H04L 41/147* (2013.01)

(58) Field of Classification Search
None
See application file for complete search history.

(56) References Cited

U.S. PATENT DOCUMENTS 7,849,497 B1 * 12/2010 Hurst ................ H04L 63/1433 726/1
8,607,067 B1 * 12/2013 Janse van Rensburg ................ H04L 63/0823 713/189
9,762,619 B1 * 9/2017 Vaidya ................ G06F 9/455
10,243,793 B1 * 3/2019 di Proietto .......... H04L 41/0816
10,599,880 B1 * 3/2020 Garimella .......... G06F 11/3457
2015/0127783 A1 * 5/2015 Lissack ............... G06F 9/45533 709/220

(Continued)

FOREIGN PATENT DOCUMENTS

WO  WO 2018/222485 A1  12/2018

OTHER PUBLICATIONS

International Search Report and Written Opinion from the International Searching Authority, dated Apr. 16, 2021, 10 pages, for corresponding International Patent Application No. PCT/US2020/067349.

*Primary Examiner* — Scott B Christensen
(74) *Attorney, Agent, or Firm* — Polsinelli PC

(57) ABSTRACT

Systems, methods, and computer-readable media for predicting policy changes in a network environment through a data serialization language. Running configurations of one or more network devices in a network environment can be collected. Further, a master device template of a new policy for the network environment can be generated through a data serialization language based on the running configurations of the one or more network devices. The master device template can include a directory-based tree structure of a simulated implementation of the new policy in the network environment. Policy changes in the network environment for the new policy can be predicted before implementing the new policy in the network environment based on simulated packet traversal through the directory-based tree structure of the simulated implementation of the policy in the network environment.

20 Claims, 11 Drawing Sheets

(56) References Cited

U.S. PATENT DOCUMENTS

| | | | |
|---|---|---|---|
| 2016/0044593 A1* | 2/2016 | Anpat | H04W 4/70 |
| | | | 370/329 |
| 2018/0089250 A1* | 3/2018 | Collins | G06F 16/211 |
| 2018/0123900 A1* | 5/2018 | Dorr | H04L 41/145 |
| 2018/0270133 A1 | 9/2018 | Yedavalli et al. | |
| 2018/0287885 A1 | 10/2018 | Shakimov et al. | |
| 2019/0052549 A1* | 2/2019 | Duggal | G06Q 30/04 |
| 2019/0278928 A1* | 9/2019 | Rungta | G06F 9/44505 |

* cited by examiner

LIVE NETWORK SANDBOXING ON A CENTRALIZED MANAGEMENT SYSTEM

TECHNICAL FIELD

The present technology pertains in general to predicting policy changes in a network environment through a data serialization language and in particular to predicting policy changes in a network environment for a new policy using YAML before the new policy is implemented in the network environment.

BACKGROUND

The effects of a new policy in a network environment can be studied before the new policy is actually implemented in the network environment. This can ensure that the new policy does not cause problems or failure in the environment. Typically, policy changes of a new policy are identified by generating a scaled down replica of a network environment and implementing the new policy in the scaled down replica of the network environment. However, there are numerous drawbacks to utilizing a scaled down replica of a network environment to identify policy changes resulting from implementation of a new policy in the network environment. Specifically, network environment replication is susceptible to human error and some topographical elements of the network environment are difficult to replicate in a scaled down replica of the network environment. In turn, this can lead to faulty policy change prediction through the scaled down replica of the network environment. Further, generating a scaled down replica to predict policy changes consumes large amounts of time and resources, e.g. human resources and computational resources.

DETAILED DESCRIPTION

Figure 1:
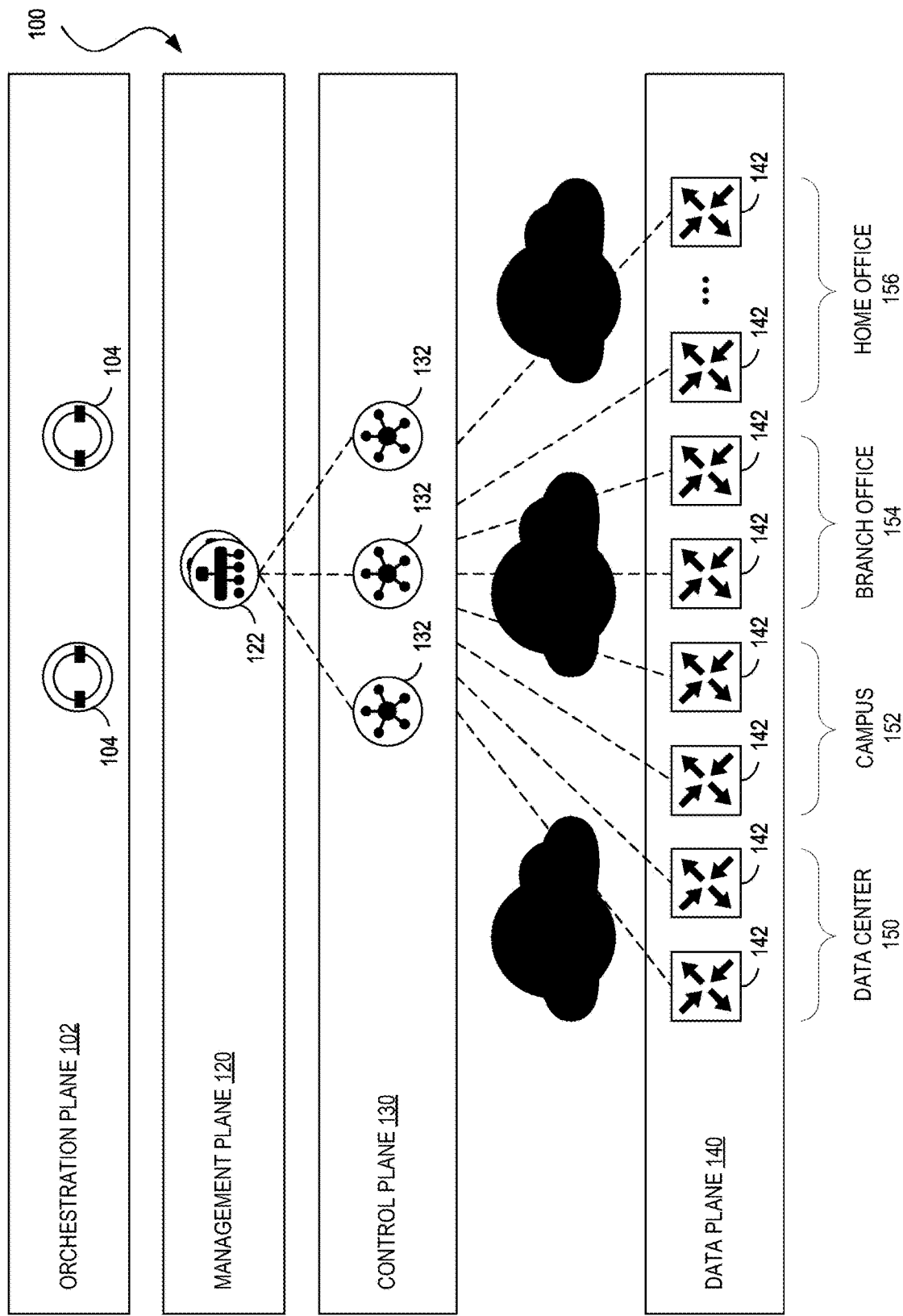
FIG. 1 illustrates an example of a high-level network architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

A method can include collecting running configurations of one or more network devices in a network environment. The method can also include generating a master device template of a new policy for the network environment through a data serialization language based on the running configurations of the one or more network devices. The master device template can include a directory-based tree structure of a simulated implementation of the new policy in the network environment. Further, the method can include predicting policy changes in the network environment for the new policy before implementing the new policy in the network environment. The policy changes can be predicted based on simulated packet traversal through the directory-based tree structure of the simulated implementation of the policy in the network environment.

Policy specific configurations of the one or more network devices can be identified from the running configurations of the one or more network devices. As follows, the directory-based tree structure of the master device template of the new policy can be generated based on the policy specific configurations of the one or more network devices. Further, a configuration of the master device template can be compared to the running configurations of the one or more network devices in the network environment to verity one or more accuracies of the master device template.

The data serialization language can include YAML. Further, the method can include generating a YAML file for each of a plurality of directories in the directory-based tree structure as part of generating the directory-based tree structure. The YAML file for each of the plurality of directories can be consolidated across the directory-based tree structure to create a consolidated YAML file. In turn, the master device template can be generated from the consolidated YAML file. The YAML file for each of the plurality of directories in the directory-based tree structure can correspond to a specific policy component of the new policy.

The method can also include generating directories for the new policy based on policy components of the new policy. The directories can be categorized according to characteristics of the policy components of new policy corresponding to the directories. In turn, the directory-based tree structure can be formed according to the characteristics of the policy components of the new policy. The characteristics of the policy components can include either or both physical and virtual locations of the policy components in the network environment. Additionally, the characteristics of the policy components can include plane implementation of the policy components in either a control plane or a data plane of the network environment.

Further, the method can include identifying policy specific configuration of the one or more network devices from the running configurations of the one or more network devices. A YAML file for each of the directories that have an equivalent policy specific configuration of the policy specific configurations of the one or more network devices can be generated.

The simulated packet traversal can be a known packet traversal through the directory-based tree structure of the simulated implementation of the policy in the network environment. As follows, the method can include applying one or more data serialization files corresponding to directories in the directory-based tree structure to the simulated packet traversal. Specifically, the one or more data serialization files can be applied in an order of the directories of the directory-based tree structure according to the known packet traversal through the directory-based tree structure. In turn, the policy changes in the network environment can be predicted based on one or more effects of application of the one or more data serialization files corresponding to the directories in the directory-based tree structure according to the order of the directories of the directory-based tree structure applied according to the known packet traversal. The effects can be predicted based on the one or more data serialization files applied to one or more simulated packets traversing at least a portion of the directory-based tree structure according to the known packet traversal.

The new policy can be selectively deployed into the network environment based on the policy changes predicted for the new policy.

A system can include one or more processors and at least one computer-readable storage medium storing instructions which, when executed by the one or more processors, cause the one or more processors to collect running configurations of one or more network devices in a network environment. The instructions can also cause the one or more processors to generate a master device template of a new policy for the network environment through YAML based on the running configurations of the one or more network devices. The master device template can include a directory-based tree structure of a simulated implementation of the new policy in the network environment. Further, the instructions can cause the one or more processors to predict policy changes in the network environment for the new policy before implementing the new policy in the network environment based on simulated packet traversal through the directory-based tree structure of the simulated implementation of the policy in the network environment.

A non-transitory computer-readable storage medium having stored therein instructions which, when executed by one or more processors, cause the one or more processors to collect running configurations of one or more network devices in a network environment. The instructions can also cause the one or more processors to generate a master device template of a new policy for the network environment through a data serialization language based on the running configurations of the one or more network devices. The master device template can include a simulated implementation of the new policy in the network environment. Further, the instructions can cause the one or more processors to predict policy changes in the network environment for the new policy before implementing the new policy in the network environment based on simulated packet traversal through at least a portion of the master device template of the new policy.

Description of Example Embodiments

The disclosed technology addresses the need in the art for efficiently predicting policy change for a new policy in a network environment before the new policy is implemented in the network environment. In particular, the disclosed technology address the need in the art for predicting policy change for a new policy in a network environment without utilizing a scaled down replica of the network environment. The present technology involves systems, methods, and computer-readable media for predicting policy changes in a network environment through a data serialization language. In particular, the present technology involves systems, methods, and computer-readable media for predicting policy changes in a network environment for a new policy using YAML before the new policy is implemented in the network environment.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network.

In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
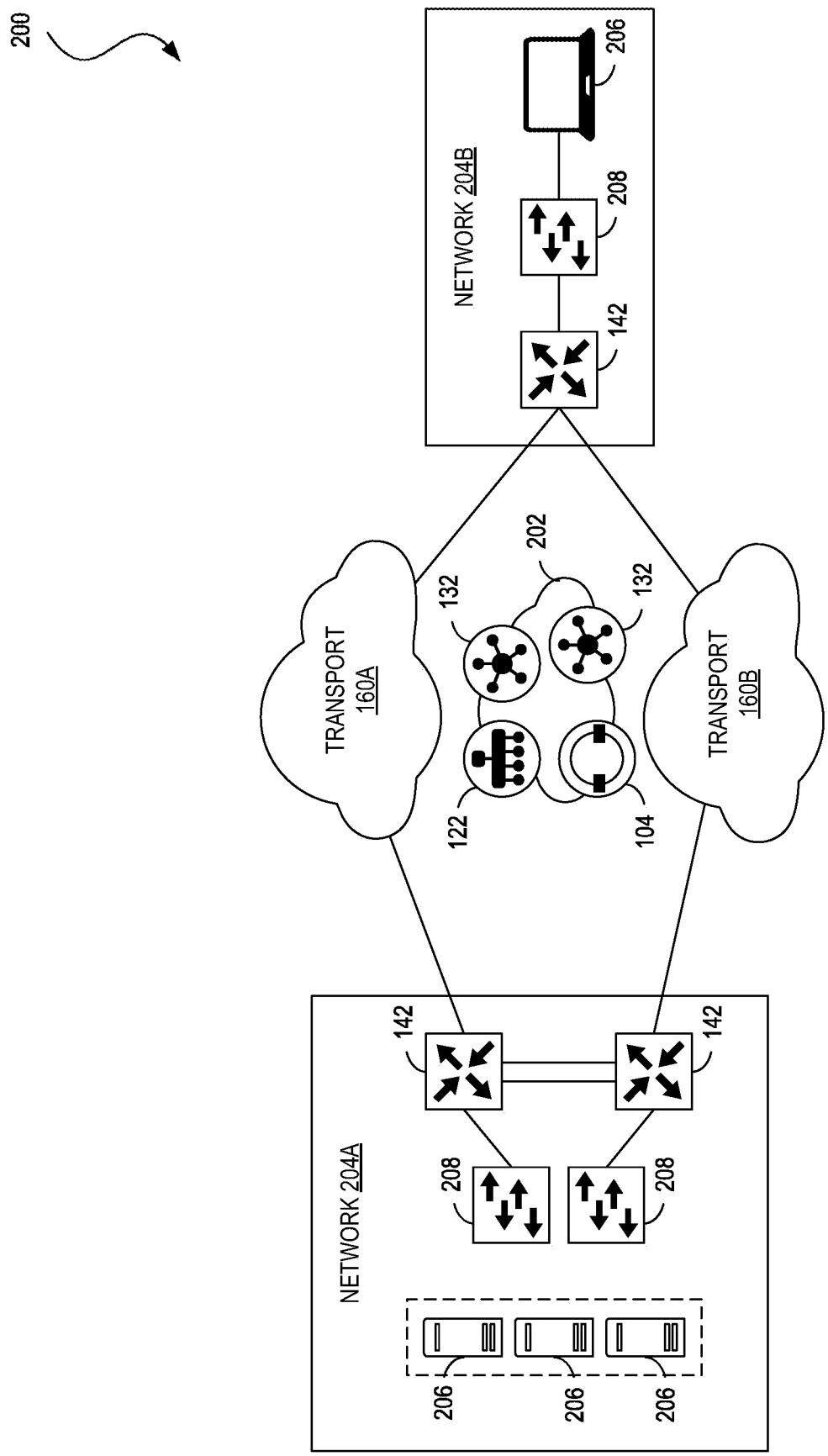
FIG. 2 illustrates an example of a network topology.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 142 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
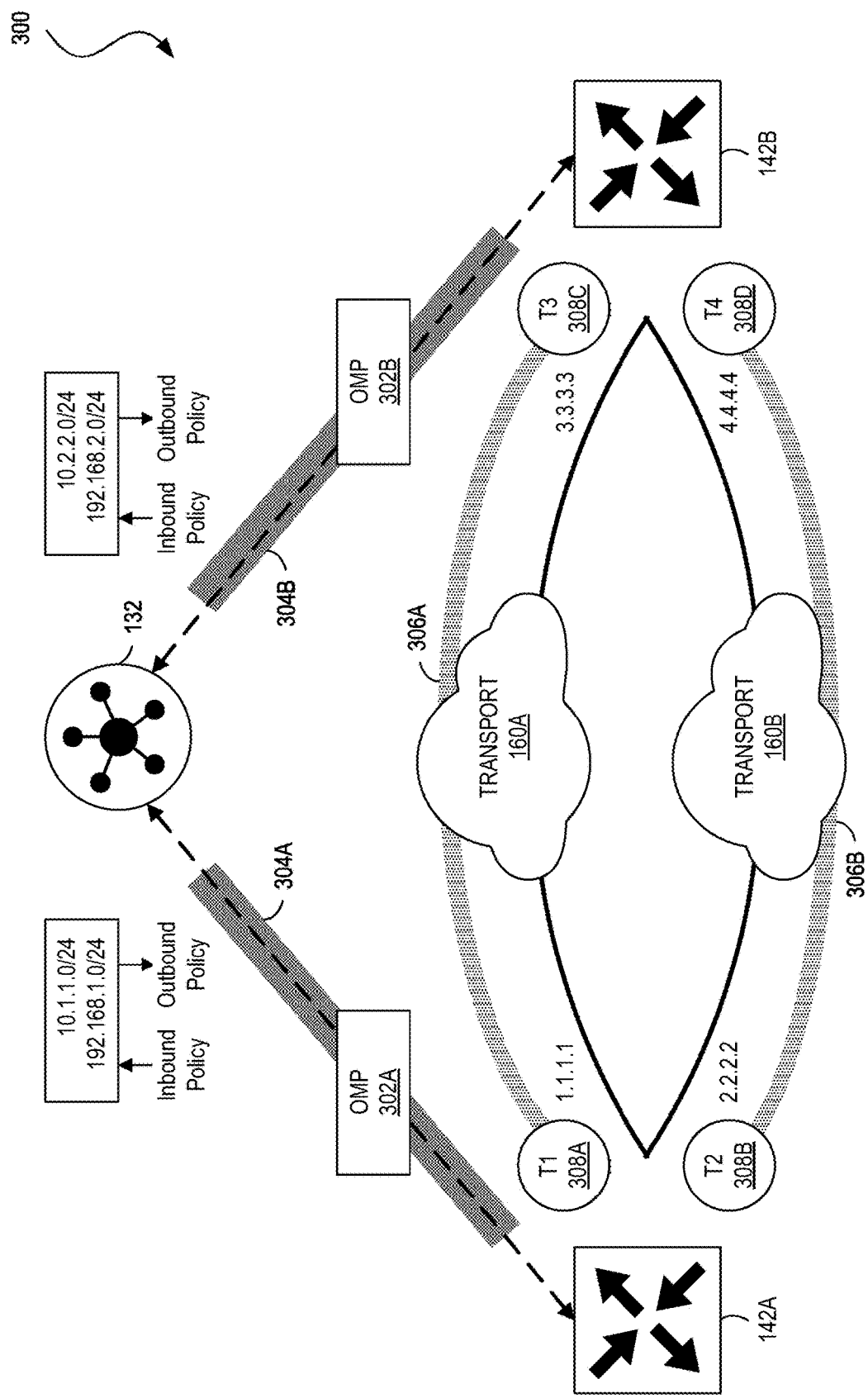
FIG. 3 illustrates an example of a diagram showing the operation of a protocol for managing an overlay network.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
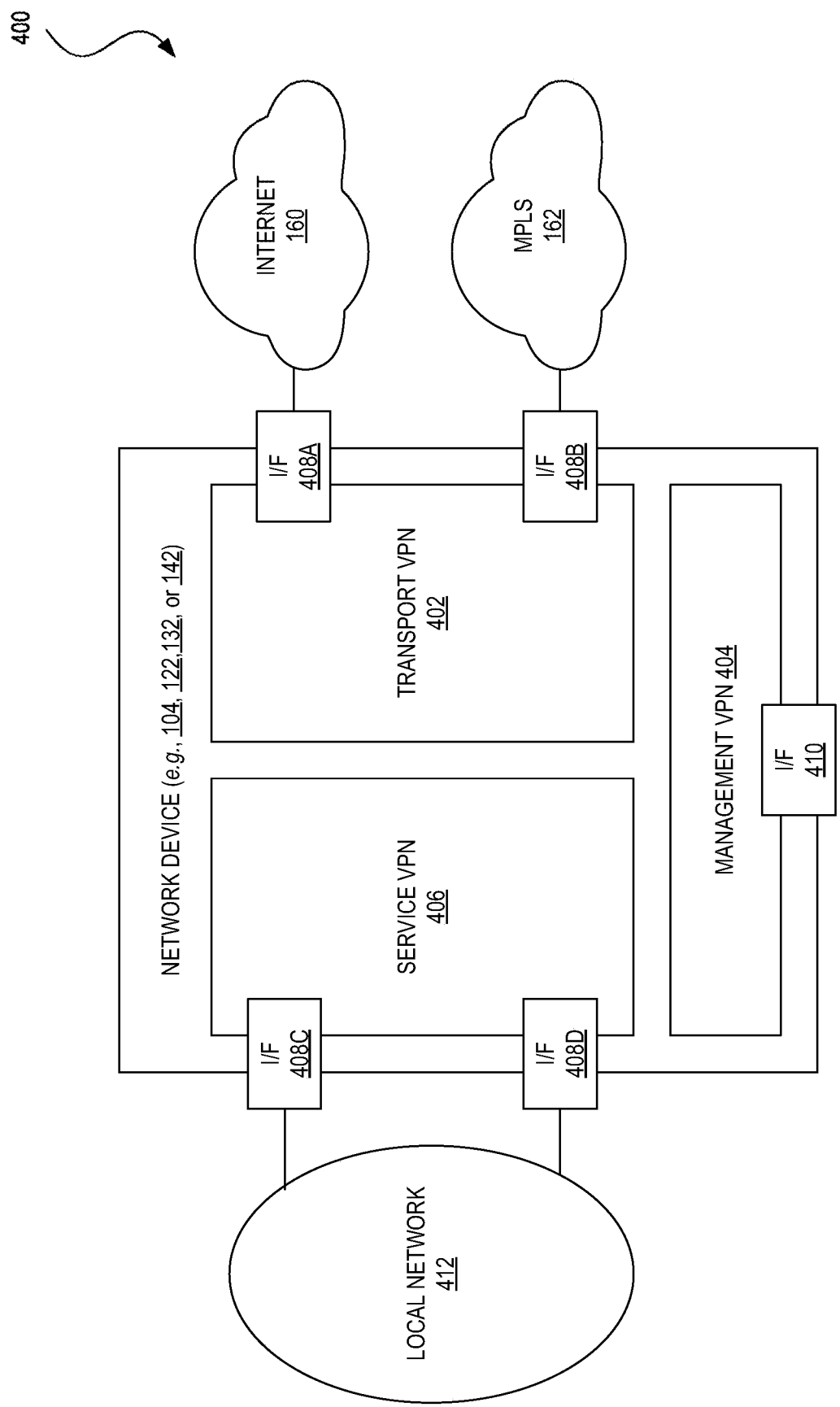
FIG. 4 illustrates an example of a diagram showing the operation of virtual private networks for segmenting a network.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5A:
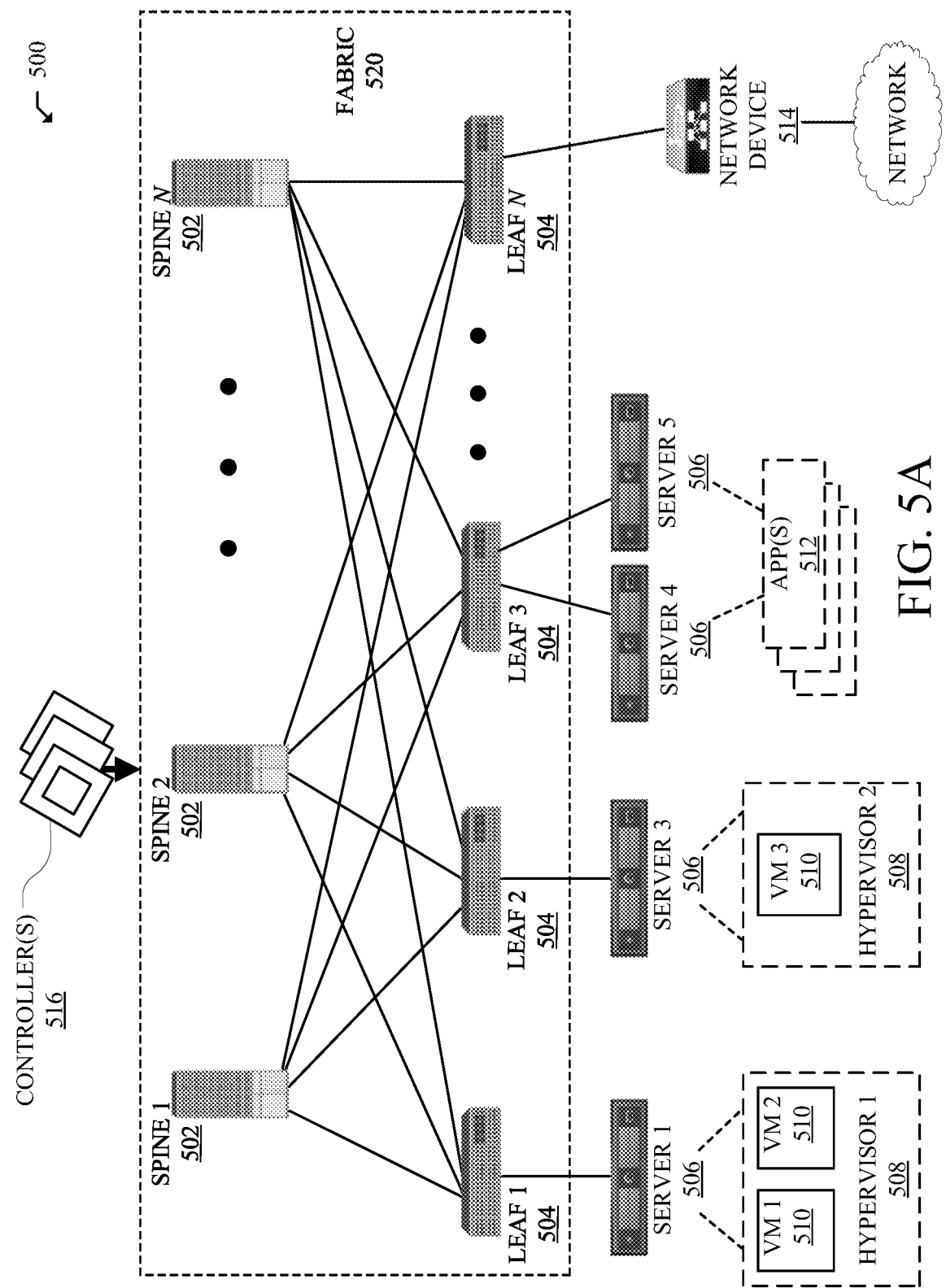
FIG. 5A illustrates a diagram of an example Network Environment, such as a data center.

FIG. 5A illustrates a diagram of an example Network Environment 500, such as a data center. In some cases, the Network Environment 500 can include a data center, which can support and/or host a cloud environment. The Network Environment 500 can include a Fabric 520 which can represent the physical layer or infrastructure (e.g., underlay) of the Network Environment 500. Fabric 520 can include Spines 502 (e.g., spine routers or switches) and Leafs 504 (e.g., leaf routers or switches) which can be interconnected for routing or switching traffic in the Fabric 520. Spines 502 can interconnect Leafs 504 in the Fabric 520, and Leafs 504 can connect the Fabric 520 to an overlay or logical portion of the Network Environment 500, which can include application services, servers, virtual machines, containers, endpoints, etc. Thus, network connectivity in the Fabric 520 can flow from Spines 502 to Leafs 504, and vice versa. The interconnections between Leafs 504 and Spines 502 can be redundant (e.g., multiple interconnections) to avoid a failure in routing. In some embodiments, Leafs 504 and Spines 502 can be fully connected, such that any given Leaf is connected to each of the Spines 502, and any given Spine is connected to each of the Leafs 504. Leafs 504 can be, for example, top-of-rack ("ToR") switches, aggregation switches, gateways, ingress and/or egress switches, provider edge devices, and/or any other type of routing or switching device.

Leafs 504 can be responsible for routing and/or bridging tenant or customer packets and applying network policies or rules. Network policies and rules can be driven by one or more Controllers 516, and/or implemented or enforced by one or more devices, such as Leafs 504. Leafs 504 can connect other elements to the Fabric 520. For example, Leafs 504 can connect Servers 506, Hypervisors 508, Virtual Machines (VMs) 510, Applications 512, Network Device 514, etc., with Fabric 520. Such elements can reside in one or more logical or virtual layers or networks, such as an overlay network. In some cases, Leafs 504 can encapsulate and decapsulate packets to and from such elements (e.g., Servers 506) in order to enable communications throughout Network Environment 500 and Fabric 520. Leafs 504 can also provide any other devices, services, tenants, or workloads with access to Fabric 520. In some cases, Servers 506 connected to Leafs 504 can similarly encapsulate and decapsulate packets to and from Leafs 504. For example, Servers 506 can include one or more virtual switches or routers or tunnel endpoints for tunneling packets between an overlay or logical layer hosted by, or connected to, Servers 506 and an underlay layer represented by Fabric 520 and accessed via Leafs 504.

Applications 512 can include software applications, services, containers, appliances, functions, service chains, etc. For example, Applications 512 can include a firewall, a database, a CDN server, an IDS/IPS, a deep packet inspection service, a message router, a virtual switch, etc. An application from Applications 512 can be distributed, chained, or hosted by multiple endpoints (e.g., Servers 506, VMs 510, etc.), or may run or execute entirely from a single endpoint.

VMs 510 can be virtual machines hosted by Hypervisors 508 or virtual machine managers running on Servers 506. VMs 510 can include workloads running on a guest operating system on a respective server. Hypervisors 508 can provide a layer of software, firmware, and/or hardware that creates, manages, and/or runs the VMs 510. Hypervisors 508 can allow VMs 510 to share hardware resources on Servers 506, and the hardware resources on Servers 506 to appear as multiple, separate hardware platforms. Moreover, Hypervisors 508 on Servers 506 can host one or more VMs 510.

In some cases, VMs 510 can be migrated to other Servers 506. Servers 506 can similarly be migrated to other physical locations in Network Environment 500. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 506, Hypervisors 508, and/or VMs 510 can represent or reside in a tenant or customer space. Tenant space can include workloads, services, applications, devices, networks, and/or resources that are associated with one or more clients or subscribers. Accordingly, traffic in Network Environment 500 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 516, Servers 506, Leafs 504, etc.

Configurations in Network Environment 500 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., ACI or VMWARE NSX). To illustrate, one or more administrators can define configurations at a logical level (e.g., application or software level) through Controllers 516, which can implement or propagate such configurations through Network Environment 500. In some examples, Controllers 516 can be Application Policy Infrastructure Controllers (APICs) in an ACI framework. In other examples, Controllers 516 can be one or more management components for associated with other SDN solutions, such as NSX Managers.

Such configurations can define rules, policies, priorities, protocols, attributes, objects, etc., for routing and/or classifying traffic in Network Environment 500. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 500, such as Leafs 504, Servers 506, Hypervisors 508, Controllers 516, etc. As previously explained, Network Environment 500 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 500. Endpoints can have one or more attributes such as a VM name, guest OS name, a security tag, application profile, etc. Application configurations can be applied between EPGs, instead of endpoints directly, in the form of contracts. Leafs 504 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 504 can tie packets with their attribute EPGs based on their identifiers and enforce policies, which can be implemented and/or managed by one or more Controllers 516. Leaf 504 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 5A, Network Environment 500 can deploy different hosts via Leafs 504, Servers 506, Hypervisors 508, VMs 510, Applications 512, and Controllers 516, such as VMWARE ESXi hosts, WINDOWS HYPER-V hosts, bare metal physical hosts, etc. Network Environment 500 may interoperate with a variety of Hypervisors 508, Servers 506 (e.g., physical and/or virtual servers), SDN orchestration platforms, etc. Network Environment 200 may implement a declarative model to allow its integration with application design and holistic network policy.

Controllers 516 can provide centralized access to fabric information, application configuration, resource configuration, application-level configuration modeling for a SDN infrastructure, integration with management systems or servers, etc. Controllers 516 can form a control plane that interfaces with an application plane via northbound APIs and a data plane via southbound APIs.

As previously noted, Controllers 516 can define and manage application-level model(s) for configurations in Network Environment 500. In some cases, application or device configurations can also be managed and/or defined by other components in the network. For example, a hypervisor or virtual appliance, such as a VM or container, can run a server or management tool to manage software and services in Network Environment 500, including configurations and settings for virtual appliances.

As illustrated above, Network Environment 500 can include one or more different types of SDN solutions, hosts, etc. For the sake of clarity and explanation purposes, various examples in the disclosure will be described with reference to an ACI framework, and Controllers 516 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 506 (e.g., physical or logical), Hypervisors 508, VMs 510, containers (e.g., Applications 512), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 5B:
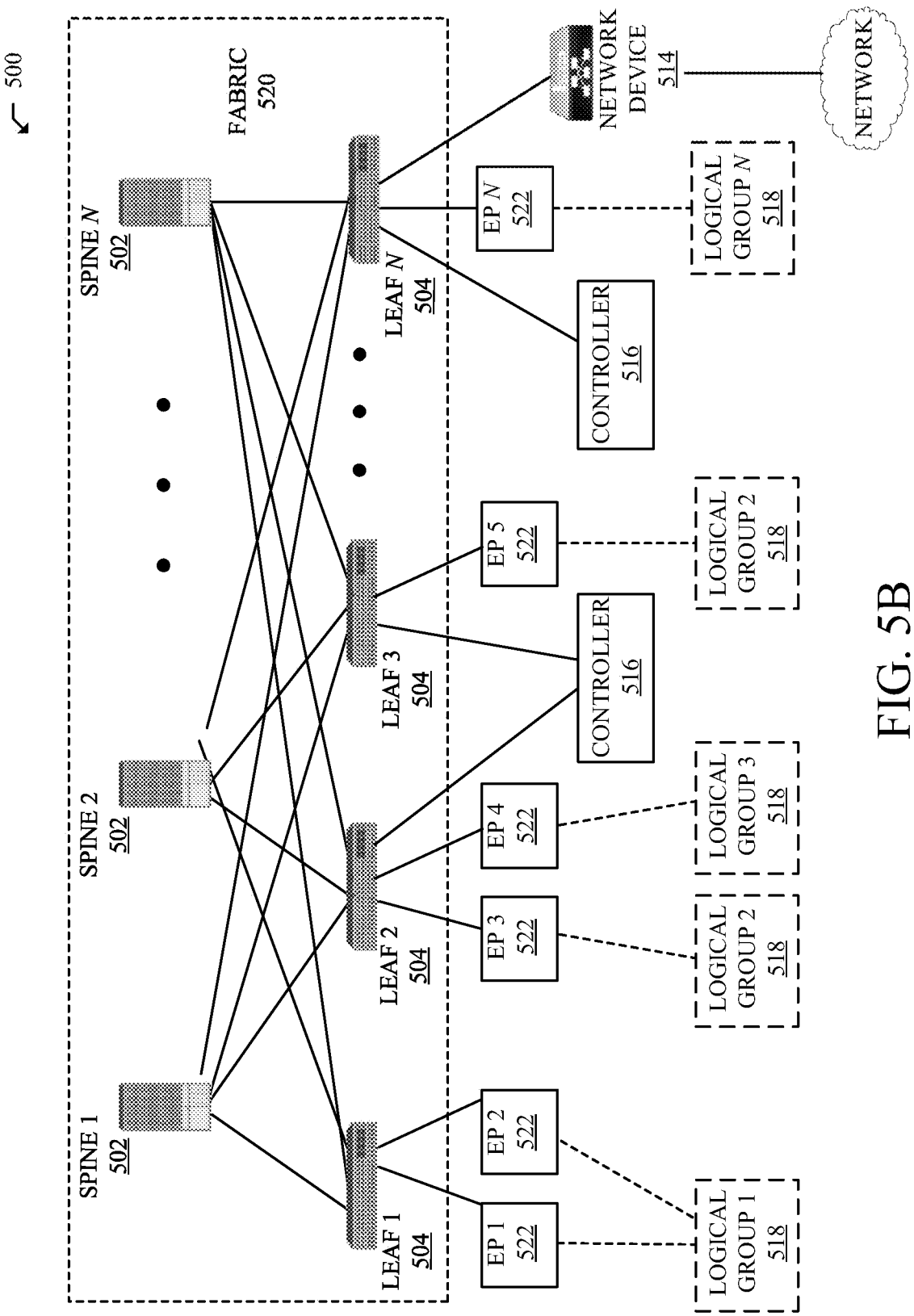
FIG. 5B illustrates another example Network Environment.

FIG. 5B illustrates another example of Network Environment 500. In this example, Network Environment 500 includes Endpoints 522 connected to Leafs 504 in Fabric 520. Endpoints 522 can be physical and/or logical or virtual entities, such as servers, clients, VMs, hypervisors, software containers, applications, resources, network devices, workloads, etc. For example, an Endpoint 522 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 522 can have an address (e.g., an identity), a location (e.g., host, network segment, VRF instance, domain, etc.), one or more attributes (e.g., name, type, version, patch level, OS name, OS type, etc.), a tag (e.g., security tag), a profile, etc.

Endpoints 522 can be associated with respective Logical Groups 518. Logical Groups 518 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 518 are EPGs in an ACI environment and/or other logical groups (e.g., SGs) in another SDN environment.

Traffic to and/or from Endpoints 522 can be classified, processed, managed, etc., based Logical Groups 518. For example, Logical Groups 518 can be used to classify traffic to or from Endpoints 522, apply policies to traffic to or from Endpoints 522, define relationships between Endpoints 522, define roles of Endpoints 522 (e.g., whether an endpoint consumes or provides a service, etc.), apply rules to traffic to or from Endpoints 522, apply filters or access control lists (ACLs) to traffic to or from Endpoints 522, define communication paths for traffic to or from Endpoints 522, enforce requirements associated with Endpoints 522, implement security and other configurations associated with Endpoints 522, etc.

In an ACI environment, Logical Groups 518 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

As discussed previously, the effects of a new policy in a network environment can be studied before the new policy is actually implemented in the network environment. This can ensure that the new policy does not cause problems or failure in the environment. Typically, policy changes of a new policy are identified by generating a scaled down replica of a network environment and implementing the new policy in the scaled down replica of the network environment. However, there are numerous drawbacks to utilizing a scaled down replica of a network environment to identify policy changes resulting from implementation of a new policy in the network environment. Specifically, network environment replication is susceptible to human error and some topographical environments of the network environment are difficult to replicate in a scaled down replica of the network environment. In turn, this can lead to faulty policy change prediction through the scaled down replica of the network environment. Further, generating a scaled down replica to predict policy changes consumes large amounts of time and resources, e.g. human resources and computational resources.

The present includes systems, methods, and computer-readable media for solving these problems/discrepancies. Specifically, the present technology involves systems, methods, and computer-readable media for predicting policy changes in a network environment through a data serialization language. Further, the present technology involves systems, methods, and computer-readable media for predicting policy changes in a network environment for a new policy using YAML before the new policy is implemented in the network environment.

Figure 6:
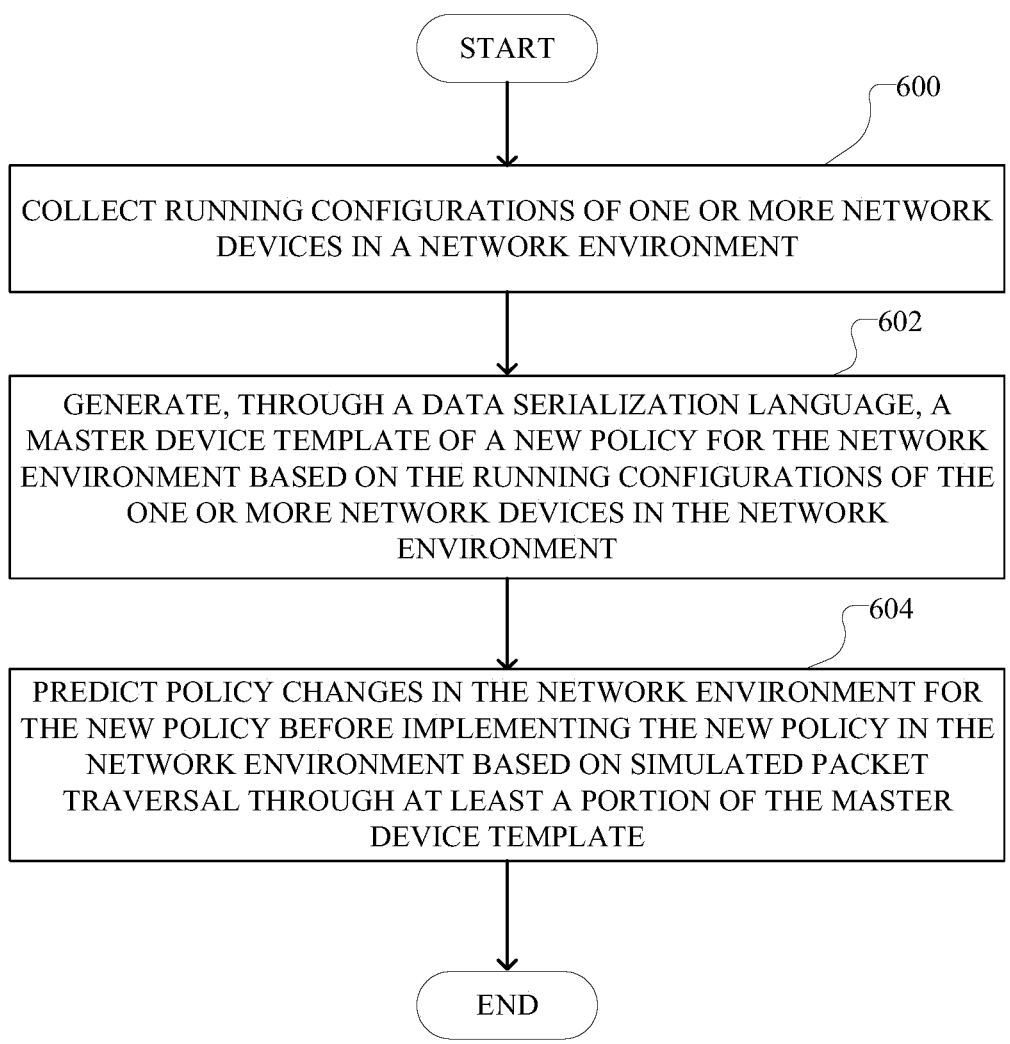
FIG. 6 illustrates a flowchart for an example method of predicting policy changes in a network environment through a data serialization language.

FIG. 6 illustrates a flowchart for an example method of predicting policy changes in a network environment through a data serialization language. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Further, each module shown in FIG. 6 represents one or more steps, processes, methods or routines in the method.

The method shown in FIG. 6 can be applied to an applicable network environment that utilizes policies to control operation of the network environment. Specifically, the method shown in FIG. 6 can be applied in an applicable SDN environment, such as the environments shown in FIGS. 1-5B. For example, the method shown in FIG. 6 can be applied in a SDN environment implemented in a datacenter.

At step 600, running configurations of one or more network devices in a network environment are collected. A network device can include an applicable network device in a network environment. For example, a network device can include a virtualized switch in a SDN environment. The one or more network devices for which running configurations are collected can include a single device in the network environment. Specifically, the one or more network devices can include a single network device experiencing errors or exhibiting other anomalous behaviors in the network environment. Further, the one or more network devices for which running configurations are collected can include a plurality of network devices in the network environment. Specifically, the network devices can include all or a subset of the total number of network devices in the network environment.

A running configuration of a network device can include applicable characteristics of the device operating to access network services or provide access to network services through a network environment. Specifically, a running configuration of a network device can include either or both policy specific configurations and device specific configurations. Policy specific configurations include applicable characteristics of one or more policies implemented at a network device to control operation of the network device in a network environment. For example, policy specific configurations can include policy components, of a specific policy implemented at a network device for controlling how the network device forwards traffic in a network environment. Device specific configurations include applicable characteristics of a device operating in a network environment irrespective of one or more policies implemented at the network device.

At step 602, a master device template of a new policy for the network environment is generated based on the running configurations of the one or more devices in the network environment. Specifically, a master device template of a new policy for the network environment can be generated before the new policy is actually implemented in the network environment. In turn, effects of the new policy in the network environment can be determined from the master device template before the new policy is actually implemented in the network environment.

The master device template of the new policy can be generated through a data serialization language based on the running configurations of the one or more devices in the network environment. A data serialization language can include an applicable language or technique for translating data structures and/or object states into a format that can be reconstructed later. For example, YAML, as will be discussed throughout this description, can be utilized to generate the master device template of the new policy. Specifically, YAML can be utilized to generate the master template of the new policy based on the running configurations of the one or more devices in the network environment.

The master device template for the new policy includes a simulated implementation of the new policy in the network environment. In turn, the master device template can be analyzed/evaluated, as will be discussed in greater detail later, to predict policy changes and corresponding effects of implementing the new policy in the network environment. The master device template can include a directory-based tree structure of policy components of the new policy representing the simulated implementation of the new policy in the network environment. The directory-based tree structure can be generated through a data serialization language such as YAML. In turn, the directory-based tree structure can be evaluated to predict policy changes in the network environment before the new policy is actually implemented in the network environment.

Predicting policy changes from a directory-based tree structure of policy components of a new policy created through a data serialization language can eliminate the need to replicate a scaled down version of the network environment to predict policy changes in the network environment. Specifically, a directory-based tree structure of policy components of a new policy created through a data serialization language based on running configurations of devices in the network environment can be used to predict policy changes without replicating a scaled down version of the network environment. In turn, this can save resource, e.g. computational and human resource, usage in predicting policy change in a network environment.

The directory-based tree structure of policy components can be generated from the new policy based on the policy components of the new policy. Specifically, a directory can be created for each policy component of the new policy. In turn, each directory in the directory-based tree structure can correspond to a specific policy component of the new policy.

In generating the directory-based tree structure for the new policy, directories included in the directory-based tree structure can be categorized and organized to form the directory-based tree structure. Specifically, the directories can be categorized and subsequently organized in a hierarchical fashion based on the categorizations to form the directory-based tree structure. In turn, and as will be discussed in greater detail later, directories, e.g. data serialization files in each of the corresponding directories, can be evaluated based, at least in part, on the organization of the directories within the directory-based tree structure.

The directories can be categorized and organized to form the directory-based tree structure based on characteristics of the policy components of the new policy corresponding to each of the directory. Characteristics of the policy components used in categorizing and organizing the corresponding directories to form the directory-based tree structure can include applicable characteristics related to enforcement of the policy components. Specifically, characteristics of the policy components of the new policy used in categorizing and organizing the directories to form the directory-based tree structure can include either or both physical and virtual locations of the policy components in the network environment. For example, directories can be categorized and organized based on whether corresponding policy components are localized policy components, e.g. localized vEdge router and localized cEdge router policy components, or centralized policy components. Further, characteristics of the policy components of the new policy used in categorizing and organizing the directories to form the directory-based tree structure can include whether the policy components are implemented in a control plane or a data plane of the network environment.

Figure 7:
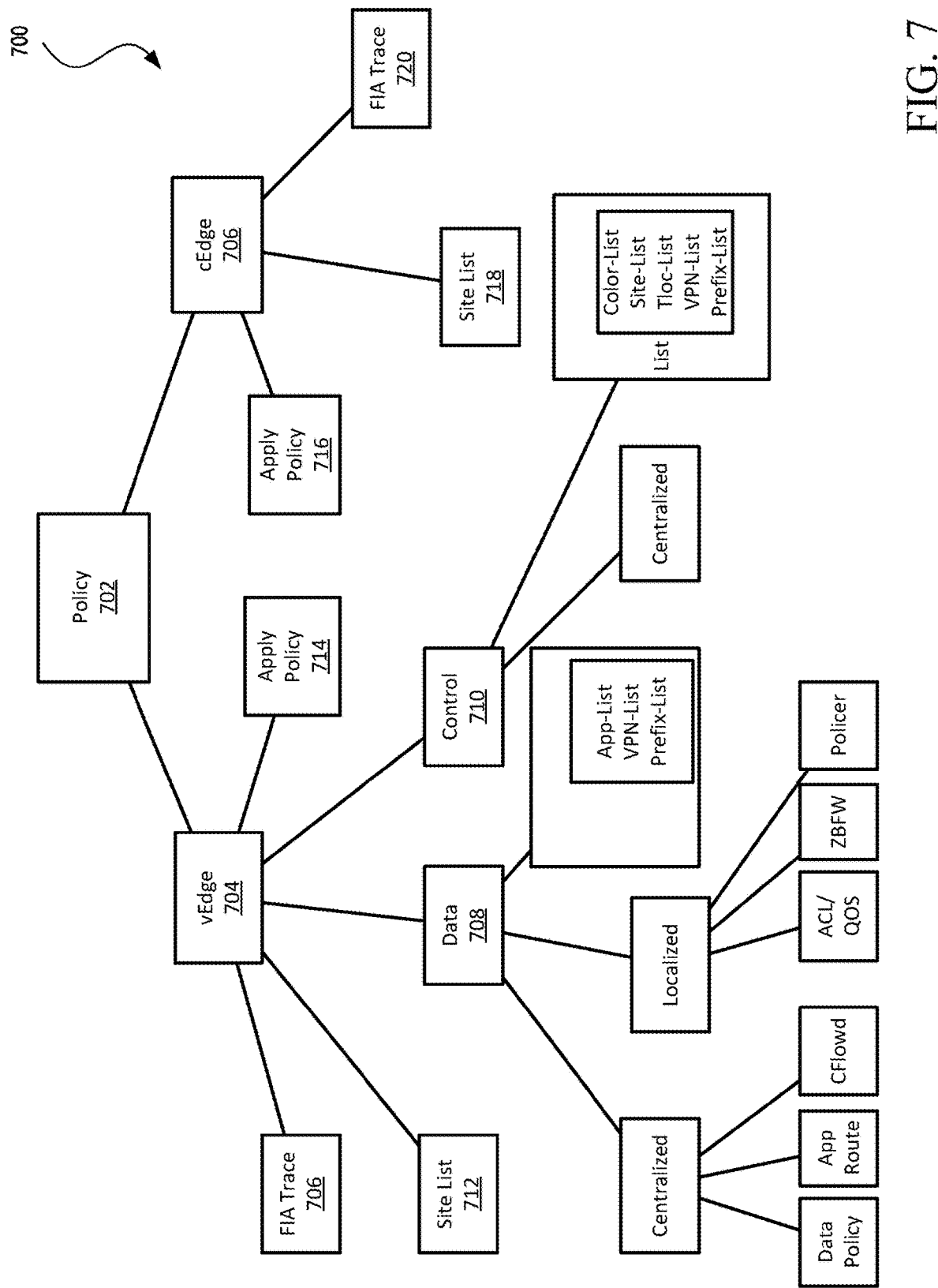
FIG. 7 shows an example directory-based tree structure for a new policy in a network environment with directories that are categorized and organized based on characteristics of corresponding policy components of the new policy.

FIG. 7 shows an example directory-based tree structure 700 for a new policy 702 in a network environment with directories that are categorized and organized based on characteristics of corresponding policy components of the new policy. Specifically, in the example directory-based tree structure 700, the directories are first categorized for a localized vEdge policy 704 and a localized cEdge policy 706. Then the directories are categorized into a centralized policy. In the example directory-based tree structure 700, the localized vEdge policy components 704 include components involving the local fabric controller, e.g. Cisco® Fabric Interface ASIC (FIA) trace 706, data based policies 708 which are both localized and centralized, control based policies 710 which are both localized and centralized, and the list of sites 712, and the policies 714 which are actually applied. Further, in the example directory-based tree structure 700, the localized cEdge policy components 706 also have a similar high level directory structure as the vEdge policy components. However and as shown in the example directory-based tree structure 700, the sub-level directory structures 716, 718, and 720 differ from the vEdge policy components 706, 708, 710, 712, and 714, e.g. when viewed in totality of the vEdge policy components.

Returning back to FIG. 6, a data serialization language can be used to write a data serialization file in the directories in the directory-based tree structure based on the collected running configurations of the one or more network devices in the network environment. Specifically, a data serialization file, e.g. YAML file, can be created for each directory having a corresponding policy specific configuration of the one or more network devices in the network environment, e.g. as identified from the running configurations of the one or more network devices. For example, if a directory for a policy component of the new policy has an equivalent, e.g. matches, a policy specific configuration of the one or more network devices in the network environment, then a data serialization file can be written to the directory. A data serialization file written to a directory in the directory-based tree structure can be created, using a data serialization language, based on either or both a policy component of the new policy corresponding to the directory and an equivalent/matching policy specific configuration of the one or more network devices in the network environment. For example, a YAML file can be written to a directory that simulates implementation of a policy component of the new policy, corresponding to the directory, at the one or more network devices in the network environment based on the running configurations of the one or more network devices.

After the data serialization files are created for a plurality of directories, e.g. those directories including corresponding policy specific configurations of the one or more devices in the network environment, then the directories are consolidated across the directory-based tree structure to create a consolidated data serialization file. Specifically, corresponding YAML files in the directories of the directory-based tree structure can be consolidated across the directory-based tree structure to create a consolidated YAML file. As follows, the consolidated data serialization file can be used to generate the master device template for the new policy. Specifically, one or more policy templates and one or more feature templates for the one or more network devices in the network environment can be generated from the consolidated data serialization file. In turn, the master device template for the new policy can be generated from the one or more policy templates and the one or more feature templates.

In various embodiments, a dummy master device template can be created from a consolidated data serialization file. Specifically, one or more dummy policy templates and one or more dummy feature templates can be created for the one or more network devices in the network environment from the consolidated data serialization file. Dummy master device templates, dummy policy templates, and dummy feature templates can be created when the one or more network devices in the network environment are managed by an applicable network management appliance, such as Cisco® vManage.

Master device templates generated according to the techniques described herein can be validated. Specifically, generated master device templates can be validated to verify one or more accuracies of the master device templates in representing a simulation of the implementation of the new policy in the network environment. More specifically, a configuration of the master device template, e.g. a running configuration of the master device template in implementing the new policy, can be compared to the collected running configurations of the one or more network devices in the network environment. If the configuration of the master device template matches, e.g. within a specific threshold, the running configurations of the one or more device in the network environment, then the master device template can be verified as accurate. As follows, if the master device template is verified as accurate, then it can be used to predict policy changes of the new policy in the network environment.

Once the master device template is created, and potentially verified as accurate, then, at step 604, policy changes for implementing the new policy in the network environment are predicted. Policy changes, as used herein, can include effects in the network environment of implementing the new policy in the network environment. For example, a policy change can include that a specific policy change will cause a device to drop packets flowing through the device. The policy changes can be predicted, using the master device template, before the new policy is actually implemented in the network environment. In turn, this can eliminate the need to reproduce the network environment, e.g. create a snapshot of the network environment, to predict policy changes in the network environment before the new policy is deployed in the network environment.

The new policy can be selectively deployed into the network environment based on predicted policy changes for the new policy. Specifically, if the predicted policy changes for the new policy include specific actions performed on traffic, then a network administrator or network management system can refrain from deploying the new policy into the network environment. For example, if the new policy causes unexpected packet drops at a network device in the network environment, then a network management system can refrain from deploying the new policy into the network environment.

The policy changes for the new policy can be predicted based on the master device template by simulating packet traversal through at least a portion of the master device template. Specifically, the policy changes for the new policy can be predicted based on the directory-based tree structure by simulating packet traversal through at least a portion of the directory-based tree structure. More specifically, data serialization files corresponding to directories in the directory-based tree structure can be applied as part of the simulated packet traversal to observe the effects/results of the policy components corresponding to the directories on the simulated packet traversal. For example, if a policy component of the new policy causes a packet to be forwarded to an incorrect destination, e.g. as observed through application of a YAML file corresponding to the policy component in a simulated packet traversal, then predicted policy changes for the new policy can include that the new policy will cause packet forwarding to incorrected destinations.

The simulated packet traversal used in predicting policy changes based on the master device template can travel a known packet traversal path through at least a portion of the master device template. Specifically, the simulated packet traversal can travel a known packet traversal path through at least a portion of the directory-based tree structure to predict policy changes for the new policy based on the directory-based tree structure. More specifically, the known packet path can pass through one or more directories in the directory-based tree structure in a known order. In turn, a data serialization file corresponding to each of the one or more directories can be applied to the packet based on the known order of the known packet path to apply the policy components of the new policy in the known order based on the known packet path. As follows, the effects of the data serialization files applied to the packet based on the known order of the known packet path can be observed to ultimately predict policy changes for the new policy in the network environment.

In a specific example, the known packet path can map to all of a portion of the directories in the directory-based tree structure. In turn, the YAML file of the first directory in the known packet path can be applied to a packet of a simulated packet traversal. As follows, the effect of the policy component corresponding to the first directory on the packet can be identified based on application of the YAML file of the first directory to the packet. This result can be stored and the simulated packet traversal can move to the next directory of the directory-based tree structure in the known packet path. Then, the YAML file of the next directory can be applied and the effects of the policy component corresponding to the next directory can be predicted. This process can be repeated until all directories of the directory-based tree structure in the known packet path are applied. Alternatively, this process can be repeated until a dropped packet is observed through application of a YAML file of a directory in the known packet path.

Figure 8:
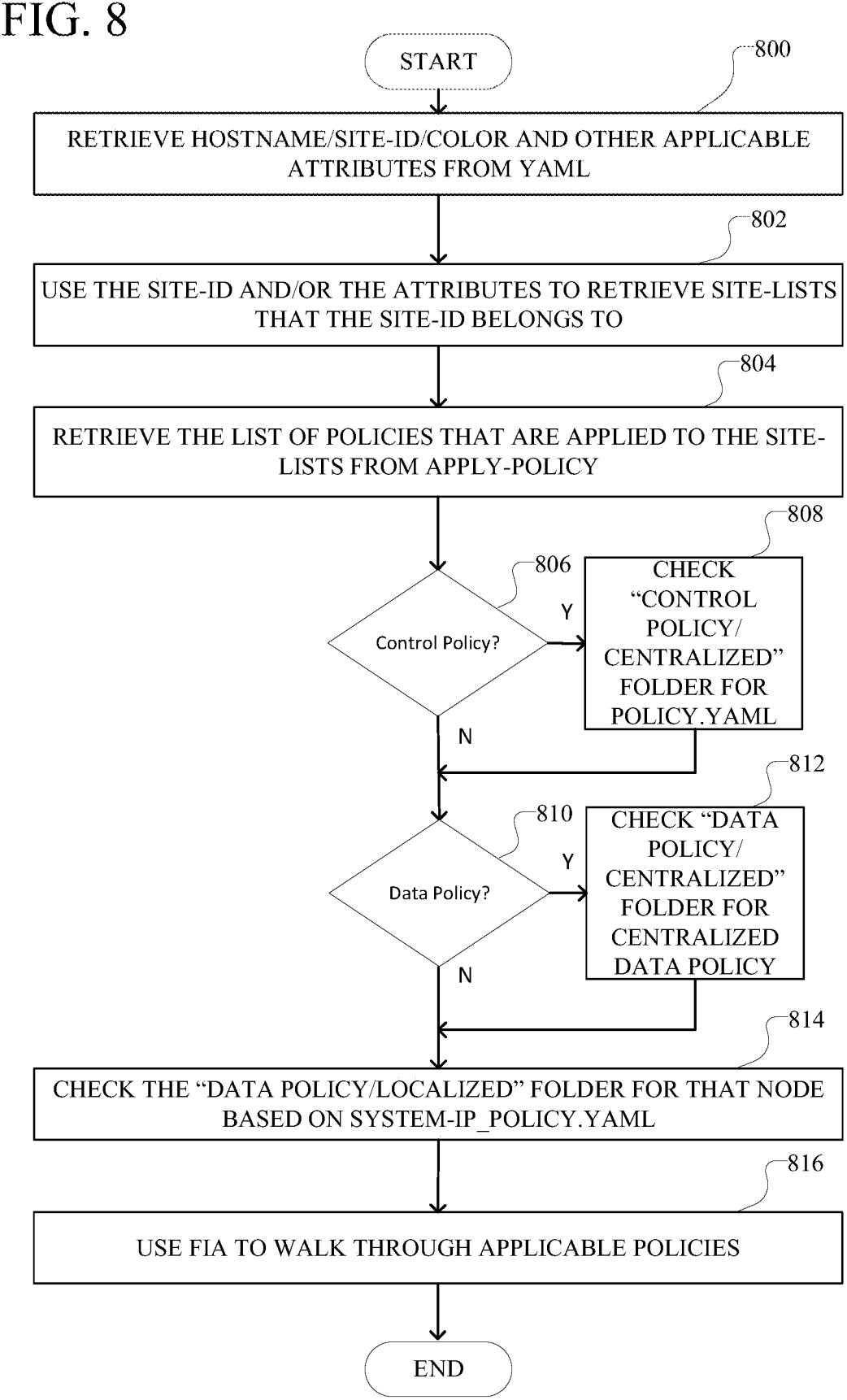
FIG. 8 illustrates a flowchart for an example method of predicting policy changes in a network environment through a master device template created through YAML.

FIG. 8 illustrates a flowchart for an example method of predicting policy changes in a network environment through a master device template created through YAML. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated. Further, each module shown in FIG. 8 represents one or more steps, processes, methods or routines in the method.

The method shown in FIG. 8 can be applied to an applicable network environment that utilizes policies to control operation of the network environment. Specifically, the method shown in FIG. 8 can be applied in an applicable SDN environment, such as the environments shown in FIGS. 1-5B. For example, the method shown in FIG. 8 can be applied in a SDWAN environment.

At step 800, a hostname, Site-ID, Color, and other applicable attributes are collected from YAML for implementing a new policy at one or more network devices in a network environment. At step 802, the Site-ID and/or the attributes are used to retrieve Site-Lists to which the Site-ID belongs. At step 804, the policies/policy components of the new policy that are applied to the Site-Lists are retrieved from the Apply-Policy. These retrieved policy/policy components can include control and/or data policies/policy components.

The method continues to decision point 806 where it is determined if the retrieved policy is a control policy. If it is determined that a policy on the retrieved list of policies is a control policy, then at step 808, a "control policy/centralized" datastore/folder is checked for the YAML file corresponding to the policy. If it is determined that a policy on the retrieved list of policies is not a control policy, then the method continues to decision point 810 where it is determined whether the policy on the retrieved list of policies is a data policy. Further, after the YAML file corresponding to the control policy is retrieved at step 808, then the method continues to decision point 810 where it is determined whether another policy on the retrieved policy list is a data policy.

At decision point 810, if it is determined that the policy on the retrieved list is a data policy, then at step 812, a "data policy/centralized" datastore/folder is checked for the YAML file corresponding to the policy. If it is determined that the policy is not a data policy at decision point 810, then the method continues to step 814, where the "data policy/localized" datastore/folder is checked based on a system-IP_policy.yaml. Further, after the YAML file corresponding to the data policy is retrieved at step 812, then the method also continues to step 814. After step 814, the method continues to step 816, where a fabric controller, e.g. FIA, is used to walk through the applicable policies, e.g. those retrieved at steps 808, 812, and 814, to predict policy changes of the new policy.

Figure 9:
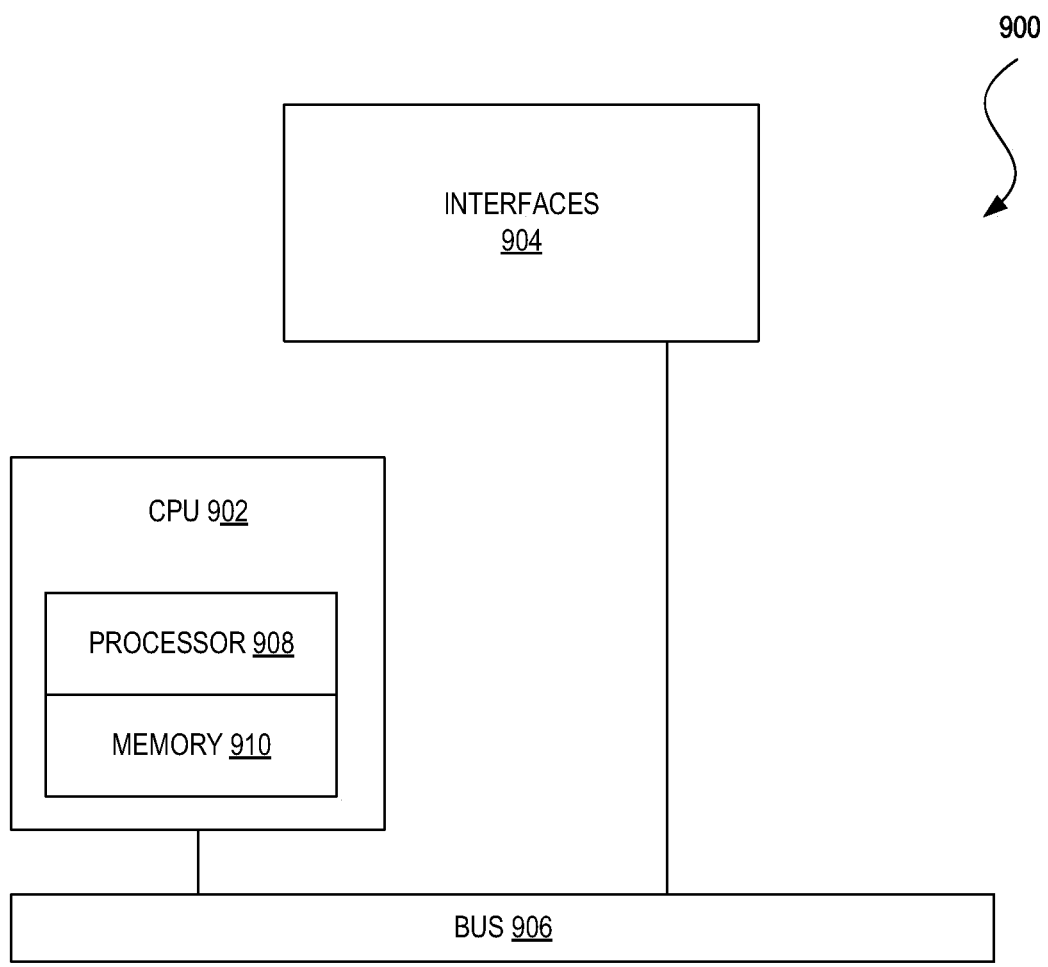
FIG. 9 illustrates an example network device.

FIG. 9 illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media. In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10:
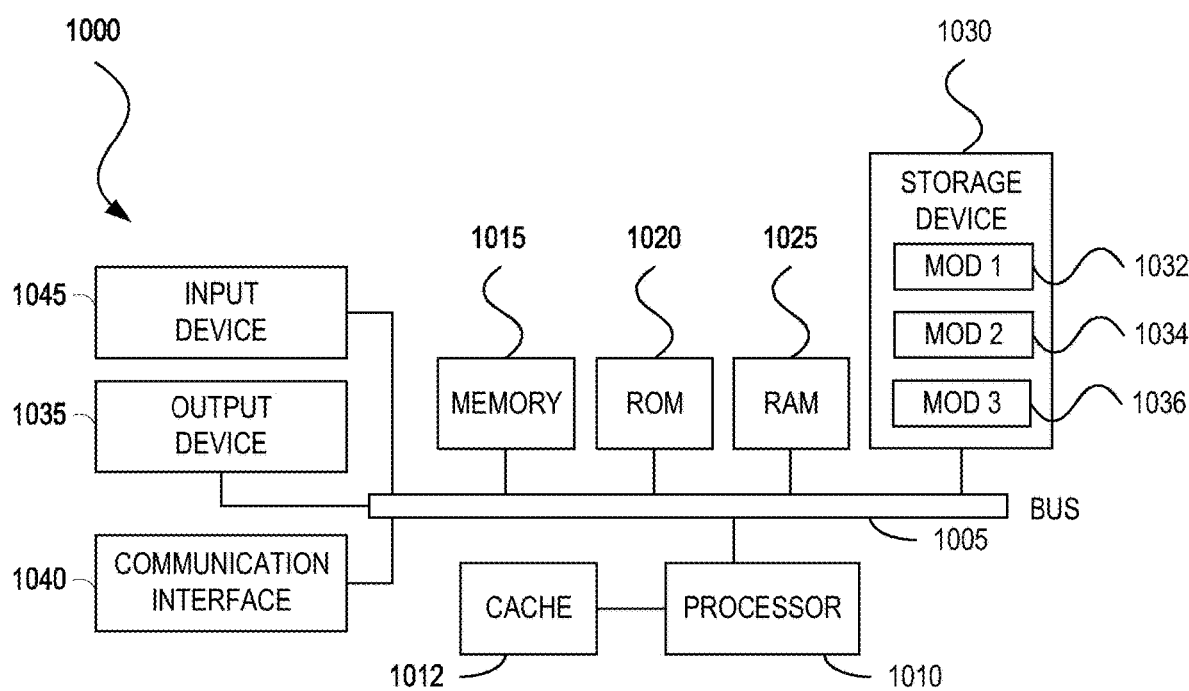
FIG. 10 illustrates an example computing system.

FIG. 10 illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function. For clarity of explanation, in some instances the present technology may be presented as including individual functional blocks including functional blocks comprising devices, device components, steps or routines in a method embodied in software, or combinations of hardware and software.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   collecting information associated with a new policy to be implemented in a network environment;
   collecting running configurations of one or more network devices in the network environment;
   collecting information associated with at least one current policy of the network environment;
   generating a master device template of the new policy for the network environment through a data serialization language based on the information associated with the new policy and the running configurations of the one or more network devices,
     wherein the master device template includes a directory-based tree structure of a simulated implementation of the new policy in the network environment based on the information associated with the at least one current policy of the network environment and the information associated with the new policy;
   predicting policy changes associated with the at least one current policy and the new policy from deploying the new policy based on simulated packet traversal through the directory-based tree structure of the master device template; and
   selectively deploying the new policy into the network environment based on the predicted policy changes.

2. The method of claim 1, further comprising:
   identifying policy specific configurations of the one or more network devices from the running configurations of the one or more network devices; and
   generating the directory-based tree structure of the master device template of the new policy based on the policy specific configurations of the one or more network devices.

3. The method of claim 1, further comprising comparing a configuration of the master device template to the running configurations of the one or more network devices in the network environment to verify one or more accuracies of the master device template.

4. The method of claim 1, wherein the data serialization language is YAML.

5. The method of claim 4, further comprising:
   generating a YAML file for each of a plurality of directories in the directory-based tree structure as part of generating the directory-based tree structure;
   consolidating the YAML file for each of the plurality of directories across the directory-based tree structure to create a consolidated YAML file; and
   generating the master device template from the consolidated YAML file.

6. The method of claim 5, wherein the YAML file for each of the plurality of directories in the directory-based tree structure corresponds to a specific policy component of the new policy.

7. The method of claim 1, further comprising:
   generating directories for the new policy based on policy components of the new policy;
   categorizing the directories according to characteristics of the policy components of the new policy corresponding to the directories; and
   forming the directory-based tree structure according to the characteristics of the policy components of the new policy.

8. The method of claim 7, wherein the characteristics of the policy components include either or both physical and virtual locations of the policy components in the network environment.

9. The method of claim 7, wherein the characteristics of the policy components include plane implementation in either a control plane or a data plane of the policy components in the network environment.

10. The method of claim 7, further comprising:
    identifying policy specific configurations of the one or more network devices from the running configurations of the one or more network devices; and
    generating a YAML file for each of the directories that have an equivalent policy specific configuration of the policy specific configurations of the one or more network devices as part of generating the directory-based tree structure of the master device template of the new policy based on the policy specific configurations of the one or more network devices.

11. The method of claim 1, wherein the simulated packet traversal is a known packet traversal through the directory-based tree structure of the simulated implementation of the policy in the network environment.

12. The method of claim 11, further comprising:
    applying one or more data serialization language files corresponding to directories in the directory-based tree structure to the simulated packet traversal in an order of the directories of the directory-based tree structure according to the known packet traversal through the directory-based tree structure; and
    predicting the policy changes in the network environment based on one or more effects of application of the one or more data serialization files corresponding to the directories in the directory-based tree structure according to the order of the directories of the directory-based tree structure applied according to the known packet traversal.

13. The method of claim 12, wherein the effects are predicted based on the one or more data serialization files applied to one or more simulated packets traversing at least a portion of the directory-based tree structure according to the known packet traversal.

14. The method of claim 1, further comprising selectively deploying the new policy into the network environment based on the policy changes predicted for the new policy.

15. A system comprising:
    one or more processors; and
    at least one computer-readable storage medium having stored therein instructions which, when executed by the one or more processors, cause the one or more processors to perform operations comprising:
collecting information associated with a new policy to be implemented in a network environment;
collecting running configurations of one or more network devices in a network environment;
collecting information associated with at least one current policy of the network environment;
generating a master device template of the new policy for the network environment through YAML based on the information associated with the new policy and the running configurations of the one or more network devices,
wherein the master device template includes a directory-based tree structure of a simulated implementation of the new policy in the network environment based on the information associated with the at least one current policy of the network environment and the information associated with the new policy;
predicting policy changes associated with the at least one current policy and the new policy from deploying the new policy based on simulated packet traversal through the directory-based tree structure of the master device template; and
selectively deploying the new policy into the network environment based on the predicted policy changes.

16. The system of claim 15, wherein the instructions which, when executed by the one or more processors, further cause the one or more processors to perform operations comprising comparing a configuration of the master device template to the running configurations of the one or more network devices in the network environment to verify one or more accuracies of the master device template.

17. The system of claim 15, wherein the instructions which, when executed by the one or more processors, further cause the one or more processors to perform operations comprising:
generating a YAML file for each directory in the directory-based tree structure as part of generating the directory-based tree structure;
consolidating the YAML file for each directory across the directory-based tree structure to create a consolidated YAML file; and
generating the master device template from the consolidated YAML file.

18. The system of claim 15, wherein the instructions which, when executed by the one or more processors, further cause the one or more processors to perform operations comprising:
generating directories for the new policy based on policy components of the new policy;
categorizing the directories according to characteristics of the policy components of the new policy corresponding to the directories; and
forming the directory-based tree structure according to the characteristics of the policy components of the new policy.

19. The system of claim 15, wherein the simulated packet traversal is a known packet traversal through the directory-based tree structure of the simulated implementation of the policy in the network environment and the instructions which, when executed by the one or more processors, further cause the one or more processors to perform operations comprising:
applying one or more YAML files corresponding to directories in the directory-based tree structure to the simulated packet traversal in an order of the directories of the directory-based tree structure according to the known packet traversal through the directory-based tree structure; and
predicting the policy changes in the network environment based on one or more effects of application of one or more data serialization files corresponding to the directories in the directory-based tree structure according to the order of the directories of the directory-based tree structure applied according to the known packet traversal.

20. A non-transitory computer-readable storage medium having stored therein instructions which, when executed by one or more processors, cause the one or more processors to perform operations comprising:
collecting information associated with a new policy to be implemented in a network environment;
collecting running configurations of one or more network devices in a network environment;
collecting information associated with at least one current policy of the network environment;
generating a master device template of the new policy for the network environment through a data serialization language based on the information associated with the new policy and the running configurations of the one or more network devices,
wherein the master device template includes a directory-based tree structure of a simulated implementation of the new policy in the network environment based on the information associated with the at least one current policy of the network environment and the information associated with the new policy;
predicting policy changes associated with the at least one current policy and the new policy from deploying the new policy based on simulated packet traversal through the directory-based tree structure of the master device template;
selectively deploying the new policy into the network environment based on the predicted policy changes.

* * * * *